United States Patent
Nair et al.

(10) Patent No.: US 7,252,864 B2
(45) Date of Patent: Aug. 7, 2007

(54) OPTICAL FILM FOR DISPLAY DEVICES

(75) Inventors: Mridula Nair, Penfield, NY (US); Tamara K. Jones, Rochester, NY (US); Bradley M. Houghtaling, Rochester, NY (US); Joseph S. Sedita, Albion, NY (US); Gary A. Rakes, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/292,353

(22) Filed: Nov. 12, 2002

(65) Prior Publication Data

US 2004/0091643 A1 May 13, 2004

(51) Int. Cl.
*G02B 1/12* (2006.01)
*G02B 3/02* (2006.01)
*G02B 5/02* (2006.01)

(52) U.S. Cl. .................. 428/1.3; 428/1.5; 428/143; 428/323; 428/327; 427/163.4; 349/112; 359/493; 430/905

(58) Field of Classification Search ................ 428/1.3, 428/143–144, 323, 1.5, 327; 427/163.4; 349/112; 359/493, 483; 430/905, 908, 910, 430/912–913, 919
See application file for complete search history.

(56) References Cited

U.S. PATENT DOCUMENTS

| | | | |
|---|---|---|---|
| 3,679,451 A | | 7/1972 | Marks et al. ............. 220/2.1 R |
| 4,629,637 A | * | 12/1986 | Waldenrath et al. ....... 428/1.54 |
| 4,759,966 A | * | 7/1988 | Shimozawa et al. ........ 428/141 |
| 5,208,311 A | * | 5/1993 | Schaefer et al. ............... 528/13 |
| 5,491,009 A | * | 2/1996 | Bekele ....................... 428/35.7 |
| 5,998,013 A | * | 12/1999 | Shoshi et al. ................ 428/331 |
| 6,008,940 A | | 12/1999 | Michihata et al. .......... 359/483 |
| 6,074,741 A | | 6/2000 | Murata et al. .............. 428/327 |
| 6,107,444 A | * | 8/2000 | Bruneau et al. ............. 528/272 |
| 6,110,988 A | * | 8/2000 | Lake ........................... 522/75 |
| 6,123,877 A | * | 9/2000 | Clabburn .................... 264/1.34 |
| 6,217,176 B1 | | 4/2001 | Maekawa .................... 359/601 |
| 6,261,664 B1 | * | 7/2001 | Beeson et al. .............. 428/141 |
| 6,343,865 B1 | | 2/2002 | Suzuki ....................... 359/601 |
| 6,347,871 B2 | | 2/2002 | Matsunaga et al. ......... 359/613 |
| 6,424,786 B1 | * | 7/2002 | Beeson et al. .............. 385/146 |
| 6,426,034 B1 | * | 7/2002 | McComas et al. .......... 264/494 |
| 6,869,672 B2 | * | 3/2005 | Arai et al. ................... 428/323 |
| 6,869,675 B2 | * | 3/2005 | Nair et al. .................. 438/327 |
| 2002/0060849 A1 | | 5/2002 | Matsunaga et al. .......... 359/6.4 |

FOREIGN PATENT DOCUMENTS

| WO | 87/06161 | 10/1987 |
|---|---|---|
| WO | 02/077679 | 10/2002 |

OTHER PUBLICATIONS

Mark Alger, Polymer Science Dictionary, 2nd edition, 1997, pp. 388-389.*
Merriam-Webster's Collegiate Dictionary, 10th edition, p. 219b, coarse, p. 112b, crystallinity, 1999.*
Dow Chemical, Design Tools, Optical Properties, Haze, 2006. Retrieved from the internet [retrieved on Mar. 2, 2006] <URL: http://www.dow.com/sal/design/guide/optical.htm>.*
Arkema, Orgasol Polyamide Powders, Version 2.0, Nov. 2004.*

* cited by examiner

*Primary Examiner*—Terrel Morris
*Assistant Examiner*—Sow-Fun Hon
(74) *Attorney, Agent, or Firm*—Arthur E. Kluegel

(57) ABSTRACT

Disclosed is an optical film that comprises certain radiation cured (meth)acrylate binders and, desirably, irregular semi-crystalline asymmetric particles.

19 Claims, No Drawings

OPTICAL FILM FOR DISPLAY DEVICES

CROSS REFERENCE TO RELATED APPLICATIONS

This application is being co-filed with a commonly assigned application Ser. No. 10/292,650 entitled "Durable Overcoat Material".

FIELD OF THE INVENTION

This invention relates to an optical film for use in high definition image display devices such as LCD and CRT panels for imparting excellent abrasion resistance and such a film including certain particles that also enable the film to exhibit antiglare properties.

BACKGROUND OF THE INVENTION

LCDs and CRTs are widely employed in a variety of typical display devices such as television sets, computer terminals and the like. A key problem is improving the quality of the display devices in keeping with the trend for increased image resolution. With the advent of multimedia including, in particular, a variety of portable terminals of communication systems represented by mobile telephones and the like, innovative display systems are expected to play a very important role in the interface between man and machine. Among the concerns is improved abrasion resistance for such displays. U.S. Pat. No. 5,914,073 suggests an adhesively applied laminate of a clear resin overcoated with a polyol acrylate resin that is UV cured. U.S. Pat. No. 6,329,041 suggests a three layer hard coating with a middle buffer layer overcoated with an antireflection coating. U.S. Pat. No. 6,376,060 suggest including an inorganic filler in a hardcoat film.

LCDs play a big role in this market of portable terminals since they are light in weight and can be made compact along with their versatility for many types of displays. Since these portable terminals are frequently used outdoors, it is important to ensure good visibility of their images even in bright sunlight by suppressing glare or specular reflection as completely as possible. In order to ensure this, an antiglare film is preferably provided on the surface of the display for diffusing external light and suppressing specular reflection.

U.S. Pat. No. 5,998,013 discloses an antiglare film formed by coating a resin, containing fillers such as agglomerated silicon dioxide, onto the surface of a transparent substrate film. Another method of achieving the same is by texturing or roughening the surface of the substrate. For example, the surface of a substrate can be directly roughened by sandblasting, or embossing or the like, or by employing a method in which a porous film is formed on the surface of the substrate.

U.S. Pat. No. 6,008,940, describes a glare-proof layer comprising a resin with coarse and fine particles and a refractive index of 1.4-1.6. The fine particles are hydrophilic and have moisture contents of greater than 0.5 percent. U.S. Pat. No. 6,217,176 describes an antiglare film comprising a resin containing two types of light-transparent fine particles to control the index of refraction of the layer. U.S. Pat. No. 6,074,741 describes an antiglare material comprising a roughened surface layer derived from an ultraviolet curable resin containing an epoxy compound and a photo cationic polymerization initiator and two different populations of resin beads. U.S. Pat. No. 6,347,871 describes an antiglare layer comprising two resin coated layers wherein the, top layer contains particles smaller in size than those in the bottom layer. U.S. Pat. No. 6,343,865 relates to a non glare film onto which a low refractive index film is laminated resulting in suppressed degradation of contrast and whitening.

More recently, displays such as those with touch screens have gained prominence. Hence there has been an increasing demand for development of display screens that have good abrasion resistance and resistance to handling defects in general while providing antiglare properties.

While the prior art describes the use of resin beads and particles in antiglare coatings there is no teaching directed towards the morphology of the particles. Whereas spherical symmetric polymer particles can provide the desired antiglare properties, their highly curved surfaces can potentially disadvantage the system. When abraded, such spherical particles have a tendency to come off from the coating due to poor adhesion at the particle/binder interface. This leads to dusting and microscopic pitting of the surface resulting in increased transmission haze and reduced image contrast and sharpness. Additionally, when antiglare coatings and hard coats are coated on flexible substrates such as cellulose triacetate, adhesion to the substrate becomes increasingly important in light of the fact that such flexible substrates are often handled in wound roll form.

It is well known in the industry to use aggregated silica particles in coatings to provide antiglare properties. While these particles provide controlled haze and gloss, they can contribute to cinch abrasion in such wound rolls of flexible substrates.

Further, it is well known in the industry to use radiation curable monomers and oligomers for an abrasion resistant coating. Most of these are coated from organic solvents. While the prior art goes on to list various solvents that provide good adhesion of the coating to the base material there is no mention of the adverse effects produced by some of the listed solvents in the abrasion resistant properties of the final coating. When solvents are used that can penetrate the base support material and release additives present therein such as plasticizers, into the coating, the modulus of the coating is compromised resulting in less than excellent abrasion resistance and pencil hardness. Therefore, selection of solvent from which to apply the hard coat onto the substrate of choice is very critical.

In spite of the teachings in the arena of antiglare abrasion resistant screens, there exists a continuing need for developing a robust display screen for the reasons discussed above with either antiglare characteristics which prevent specular reflection of external light from sources such as the sun, fluorescent lamps and the like on them or excellent abrasion resistance or both since the antiglare film is coated on the outermost surface of the polarizer in the LCD.

SUMMARY OF THE INVENTION

The invention provides an optical film that comprises advantageous radiation cured (meth)acrylate binder. To achieve antiglare properties, the binder comprises irregular semicrystalline asymmetric particles. To achieve preferred abrasion resistance, the binder comprises pentaerythritol tetra(meth)acrylate and pentaerythritol tri(meth)acrylate functionalized aliphatic urethanes, with or without the particles. The invention further provides a useful dispersion, a process for making the film, and an LCD or touch screen display incorporating the film.

This invention provide films that exhibit abrasion resistance or antiglare properties and preferably both.

DETAILED DESCRIPTION OF THE INVENTION

The invention is generally described above.

As used herein the term "irregular" with respect to a particle means a particle whose surface is not smooth. The term "asymmetric" means that the particle is not symmetric about a plane. The term "low molecular weight" means a weight average molecular weight less than 10,000. Typically, the compounds will have a weight average molecular weight less than 5,000. The present invention provides an optical film containing an abrasion resistant layer, desirably functioning also as an antiglare layer, for use in high definition image display devices such as LCD or CRT panels for imparting excellent antiglare properties, abrasion, chemical and handling resistance, and a method for producing the same. In accordance with the present invention, the antiglare, abrasion resistant layer of the present invention is derived from actinic radiation curable dispersions of oligomers or monomers containing irregular semicrystalline asymmetric particles coated onto a flexible transparent support such that it provides advantageous properties such as good film formation, excellent antiglare properties, low haze, good fingerprint resistance, abrasion resistance, toughness, hardness and durability. Examples of actinic radiation include ultraviolet (UV) radiation and electronic beam radiation. Of these UV is preferred.

UV curable compositions useful for creating the antiglare, abrasion resistant layer of this invention may be cured using two major types of curing chemistries, free radical chemistry and cationic chemistry. Acrylate monomers (reactive diluents) and oligomers (reactive resins and lacquers) are the primary components of the free radical based formulations, giving the cured coating most of its physical characteristics. Photo-initiators are required to absorb the UV light energy, decompose to form free radicals, and attack the acrylate group C=C double bond to initiate polymerization. Cationic chemistry utilizes cycloaliphatic epoxy resins and vinyl ether monomers as the primary components. Photo-initiators absorb the UV light to form a Lewis acid, which attacks the epoxy ring initiating polymerization. By UV curing is meant ultraviolet curing and involves the use of UV radiation of wavelengths between 280 and 420 nm preferably between 320 and 410 nm.

Examples of UV radiation curable resins and lacquers usable for the layer useful in this invention are those derived from photo polymerizable monomers and oligomers such as acrylate and methacrylate oligomers (the term "(meth)acrylate" used herein refers to acrylate and methacrylate), of polyfunctional compounds, such as polyhydric alcohols and their derivatives having (meth)acrylate functional groups such as ethoxylated trimethylolpropane tri(meth)acrylate, tripropylene glycol di(meth)acrylate, trimethylolpropane tri(meth)acrylate, diethylene glycol di(meth)acrylate, pentaerythritol tetra(meth)acrylate, pentaerythritol tri(meth)acrylate, dipentaerythritol hexa(meth)acrylate, 1,6-hexanediol di(meth)acrylate, or neopentyl glycol di(meth)acrylate and mixtures thereof, and acrylate and methacrylate oligomers derived from low-molecular weight polyester resin, polyether resin, epoxy resin, polyurethane resin, alkyd resin, spiroacetal resin, epoxy acrylates, polybutadiene resin, and polythiol-polyene resin, and the like and mixtures thereof, and ionizing radiation-curable resins containing a relatively large amount of a reactive diluent. Reactive diluents usable herein include monofunctional monomers, such as ethyl (meth)acrylate, ethylhexyl (meth)acrylate, styrene, vinyltoluene, and N-vinylpyrrolidone, and polyfunctional monomers, for example, trimethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, or neopentyl glycol di(meth)acrylate. Among others, in the present invention, conveniently used radiation curable lacquers include urethane (meth)acrylate oligomers. These are derived from reacting diisocyanates with a oligo(poly)ester or oligo(poly)ether polyol to yield an isocyanate terminated urethane. Subsequently, hydroxy terminated acrylates are reacted with the terminal isocyanate groups. This acrylation provides the unsaturation to the ends of the oligomer. The aliphatic or aromatic nature of the urethane acrylate is determined by the choice of diisocyanates. An aromatic diisocyanate, such as toluene diisocyanate, will yield an aromatic urethane acrylate oligomer. An aliphatic urethane acrylate will result from the selection of an aliphatic diisocyanate, such as isophorone diisocyanate or hexyl methyl diisocyanate. Beyond the choice of isocyanate, polyol backbone plays a pivotal role in determining the performance of the final the oligomer. Polyols are generally classified as esters, ethers, or a combination of these two. The oligomer backbone is terminated by two or more acrylate or methacrylate units, which serve as reactive sites for free radical initiated polymerization. Choices among isocyanates, polyols, and acrylate or methacrylate termination units allow considerable latitude in the development of urethane acrylate oligomers. Urethane acrylates like most oligomers, are typically high in molecular weight and viscosity. These oligomers are multifunctional and contain multiple reactive sites. Because of the increased number of reactive sites, the cure rate is improved and the final product is cross-linked. The oligomer functionality can vary from 2 to 6.

Among others, conveniently used radiation curable resins include polyfunctional acrylic compounds derived from polyhydric alcohols and their derivatives such as mixtures of acrylate derivatives of pentaerythritol such as pentaerythritol tetraacrylate and pentaerythritol triacrylate functionalized aliphatic urethanes derived from isophorone diisocyanate. Some examples of urethane acrylate oligomers used in the practice of this invention that are commercially available include oligomers from Sartomer Company (Exton, Pa.). An example of a resin that is conveniently used in the practice of this invention is CN 968 from Sartomer Company.

A photo polymerization initiator, such as an acetophenone compound, a benzophenone compound, Michler's benzoyl benzoate, α-amyloxime ester, or a thioxanthone compound and a photosensitizer such as n-butyl amine, triethylamine, or tri-n-butyl phosphine, or a mixture thereof is incorporated in the ultraviolet radiation curing composition. In the present invention, conveniently used initiators are 1-hydroxycyclohexyl phenyl ketone and 2-methyl-1-[4-(methyl thio)phenyl]-2-morpholinopropanone-1.

The binder of the invention desirably provides a film having a pencil hardness of at least 2 H and desirably 2 H to 8 H.

The particles that provide antiglare properties are dispersed in the radiation curable antiglare, abrasion resistant layer composition as described above and are irregular semicrystalline asymmetric organic particles. In addition the particles, due to their surface irregularities, exhibit specific surface area values ranging from 2-40 $m^2/g$.

Because of their irregular structure, such particles can allow the formation of a mechanical bond with the UV cured matrix. This prevents removal and dusting of the particles from the surface of the antiglare layer during abrasion of the surface resulting in increased surface haze. Spherical particles on the other hand are difficult to adhere to a surface layer and have a higher chance of being removed from the surface during handling resulting in pitting of the surface and resulting haze.

Examples of irregular semicrystalline asymmetric particles that provide the antiglare properties to the abrasion resistant layer, including micronized irregular polyamide polymer particles, have an average particle size ranging from 2 to 20 micrometers, suitably from 2 to 15 micrometers and desirably from 5 to 10 micrometers. They are present in the layer in an amount of at least 2 wt percent and less than 50 percent, suitably from about 2 to 40 wt. percent, typically from 2 to 20 percent and desirably from 2 to 10 percent.

Examples of solvents employable for coating the antiglare, abrasion resistant layer of this invention include solvents such as methanol, ethanol, propanol, butanol, cyclohexane, heptane, toluene and xylene, esters such as methyl acetate, ethyl acetate, propyl acetate and mixtures thereof. With the proper choice of solvent, adhesion between the transparent plastic substrate film and the coating resin can be improved while minimizing migration of plasticizers and other addenda from the transparent plastic substrate film, enabling the hardness of the antiglare layer to be maintained. Suitable solvents for supports such as TAC are aromatic hydrocarbon and ester solvents such as toluene and propyl acetate.

The coating composition may also include organic solvents, preferably the concentration of organic solvent is 1-99% percent by weight of the total coating composition.

The ultraviolet polymerizable monomers and oligomers containing these irregular semicrystalline asymmetric particles are applied to the transparent flexible support and subsequently exposed to UV radiation to form an optically clear cross-linked abrasion resistant layer. The preferred UV cure absorbance energy is between 50 and 1000 mJ/cm$^2$.

The thickness of the antiglare abrasion resistant layer is generally about 0.5 to 50 micrometers preferably 1 to 20 micrometers more preferably 2 to 10 micrometers.

The antiglare layer in accordance with this invention is particularly advantageous due to superior physical properties including excellent resistance to water permeability, fingerprinting, fading and yellowing, exceptional transparency and toughness necessary for providing resistance to scratches, abrasion and blocking.

The antiglare layer is preferably colorless. But it is specifically contemplated that this layer can have some color for the purposes of color correction, or for special effects, so long as it does not detrimentally affect the formation or viewing of the display through the overcoat. Thus, there can be incorporated into the polymer, dyes that will impart color. In addition, additives can be incorporated into the polymer that will give to the layer, desired properties. Other additional compounds may be added to the coating composition, depending on the functions of the particular layer, including surfactants, emulsifiers, coating aids, lubricants, matte particles, rheology modifiers, crosslinking agents, antifoggants, inorganic fillers such as conductive and nonconductive metal oxide particles, pigments, magnetic particles, biocide, and the like.

The antiglare layer of the invention can be applied by any of a number of well known techniques, such as dip coating, rod coating, blade coating, air knife coating, gravure coating and reverse roll coating, slot coating, extrusion coating, slide coating, curtain coating, and the like. After coating, the layer is generally dried by simple evaporation, which may be accelerated by known techniques such as convection heating. Known coating and drying methods are described in further detail in Research Disclosure No. 308119, Published December 1989, pages 1007 to 1008.

Matte particles well known in the art may also be used in the coating composition of the invention, such matting agents have been described in *Research Disclosure* No. 308119, published December 1989, pages 1008 to 1009. When polymer matte particles are employed, the polymer may contain reactive functional groups capable of forming covalent bonds with the binder polymer by intermolecular crosslinking or by reaction with a crosslinking agent in order to promote improved adhesion of the matte particles to the coated layers.

In order to reduce the sliding friction of the optical film in accordance with this invention, and to improve the scratch resistance of the coating, the UV cured polymers may contain fluorinated or siloxane-based components and the coating composition may also include lubricants or combinations of lubricants. Typical lubricants include for example (1) liquid paraffin and paraffin or wax like materials such as carnauba wax, natural and synthetic waxes, petroleum waxes, mineral waxes and the like; (2) higher fatty acids and derivatives, higher alcohols and derivatives, metal salts of higher fatty acids, higher fatty acid esters, higher fatty acid amides, polyhydric alcohol esters of higher fatty acids, etc., disclosed in U.S. Pat. Nos. 2,454,043; 2,732,305; 2,976,148; 3,206,311; 3,933,516; 2,588,765; 3,121,060; 3,502,473; 3,042,222; and 4,427,964, in British Patent Nos. 1,263,722; 1,198,387; 1,430,997; 1,466,304; 1,320,757; 1,320,565; and 1,320,756; and in German Patent Nos. 1,284,295 and 1,284,294; (3) perfluoro- or fluoro- or fluorochloro-containing materials, which include poly(tetrafluoroethylene), poly(trifluorochloroethylene), poly(vinylidene fluoride, poly(trifluorochloroethylene-co-vinyl chloride), poly(meth)acrylates or poly(meth)acrylamides containing perfluoroalkyl side groups, and the like. However for lasting lubricity of the UV cured antiglare layer a polymerizable lubricant such as Additive 31, a methacryloxy-functional silicone polyether copolymer (from Dow Corning Corp.) is preferred.

In order to successfully transport materials of the invention, the reduction of static caused by web transport through manufacturing is desirable. Since the antiglare layers of this invention can get charged from static discharge accumulated by the web as it moves over conveyance equipment such as rollers and drive nips, the reduction of static is necessary to avoid attracting dust and dirt. The transparent polymer support materials of this invention have a marked tendency to accumulate static charge as they contact machine components during transport. The use of an antistatic material to reduce the accumulated charge on the web materials of this invention is desirable.

Antistatic materials may be coated on the web materials of this invention and may contain any known materials in the art which can be coated on transparent web materials to reduce static during the transport of photographic paper. Examples of antistatic coatings include conductive salts and colloidal silica. Desirable antistatic properties of the support materials of this invention may also be accomplished by antistatic additives which are an integral part of the polymer layer. Incorporation of additives that migrate to the surface of the polymer to improve electrical conductivity include fatty quaternary ammonium compounds, fatty amines, and phosphate esters. Other types of antistatic additives are hygroscopic compounds such as polyethylene glycols and hydrophobic slip additives that reduce the coefficient of friction of the web materials. An antistatic coating may be incorporated on either side of the support. The preferred surface resistivity of the antistat coat at 50% RH is less than $10^{13}$ ohm/square. Further, additional conductive layers also can be provided on the same side of the support as the antiglare layer(s) or on both sides of the support The support material for this invention can comprise various transparent polymeric films, such as films derived from triacetyl cellulose (TAC), polyethylene terephthalate (PET), diacetyl cellulose, acetate butyrate cellulose, acetate propionate cellulose, polyether sulfone, polyacrylic based resin (e.g., polymethyl methacrylate), polyurethane based resin, polyester, polycarbonate, aromatic polyamide, polyolefins (eg., polyethylene, polypropylene), polymers derived from vinyl chloride (e.g., polyvinyl chloride and vinyl chloride/vinyl acetate copolymer), polyvinyl alcohol, polysulfone, polyether, polynorbornene, polymethylpentene, polyether ketone, (meth)acrylonitrile, glass and the like. The films may vary in thickness from 1 to 50 mils or so.

Although it is desirable that the light transmissivity of these transparent substrates be as high as possible, the light transmissivity determined according to JIS K7105 & ASTM D-1003 using a BYK Gardner Haze-Gard Plus instrument should be at least 80 percent or, preferably at least 90 percent, or most preferably at least 93 percent. When the transparent substrate is used for an antiglare material mounted on a small and light-weight liquid crystal display device, the transparent substrate is preferably a plastic film. While it is a desirable condition that the thickness of the transparent substrate is as thin as possible from the standpoint of decreasing the overall weight, the thickness should be in the range from 1 to 50 mils in consideration of the productivity and other factors of the antiglare material Of the transparent support materials TAC, polycarbonate and polyester are preferred due to their overall durability and mechanical strength. Further, TAC is particularly preferable for a liquid crystal display device, since it has sufficiently low birefringence and makes it possible to laminate a non-glare film and a polarizing device to each other and furthermore can provide a display device of excellent display quality using the antiglare film.

The TAC film usable in the invention may be any one known in the art. The acetyl value of cellulose triacetate preferably is in the range of 35% to 70%, especially in the range of 55% to 65%. The weight average molecular weight of cellulose acetate preferably is in the range of 70,000 to 200,000, especially 80,000 to 190,000. The polydispersity index (weight average divided by number average molecular weight) of cellulose acetate is in the range of 2 to 7, especially 2.5 to 4. Cellulose acetate may be obtained from cellulose starting materials derived from either wood pulp or cotton linters. Cellulose acetate may be esterified using a fatty acid such as propionic acid or butyric acid so long as the acetyl value satisfies the desired range.

Cellulose acetate film generally contains a plasticizer. Examples of the plasticizers include phosphate esters such as triphenyl phosphate, biphenylyl diphenyl phosphate, tricresyl phosphate, cresyl diphenyl phosphate, octyl diphenyl phosphate, trioctyl phosphate, and tributyl phosphate; and phthalate esters such as diethyl phthalate, dimethoxyethyl phthalate, dimethyl phthalate, and dioctyl phthalate. Preferable examples of glycolic acid esters are triacetin, tributyrin, butyl phthalyl butyl glycolate, ethyl phthalyl ethyl glycolate, and methyl phthalyl ethyl glycolate. Two or more plasticizers shown above may be combined. The plasticizer is preferably contained in the film in an amount of not more than 20 weight %, especially of 5% to 15 weight %. Films prepared from polymers other than cellulose triacetate may also contain appropriately the above plasticizer.

The TAC of the invention may contain particles of an inorganic or organic compound to provide surface lubrication. Examples of the inorganic compound include silicon dioxide, titanium dioxide, aluminum oxide, zirconium oxide, calcium carbonate, talc, clay, calcined kaolin, calcined calcium silicate, hydrate calcium silicate, aluminum silicate, magnesium silicate, and calcium phosphate. Preferred are silicon dioxide, titanium dioxide, and zirconium oxide, and especially silicon dioxide. Examples of the organic compound (polymer) include silicone resin, fluororesin and acrylic resin. Preferred is acrylic resin.

The TAC film is preferably prepared by utilizing a solvent casting method. In more detail, the solvent casting method comprises the steps of: casting the polymer solution fed from a slit of a solution feeding device (die) on a support and drying the cast layer to form a film. In a large-scale production, the method can be conducted, for example, by the steps of casting a polymer solution (e.g., a dope of cellulose triacetate) on a continuously moving band conveyor (e.g., endless belt) or a continuously rotating drum, and then vaporizing the solvent of the cast layer.

Any support can be employed in the solvent casting method, so long as the support has the property that a film formed thereon can be peeled therefrom. Supports other than metal and glass plates (e.g., plastic film) are employable, so long as the supports have the above property. Any die can be employed, so long as it can feed a solution at a uniform rate. Further, as methods for feeding the solution to the die, a method using a pump to feed the solution at a uniform rate can be employed. In a small-scale production, a die capable of holding the solution in an appropriate amount can be utilized.

A polymer employed in the solvent casting method is required to be capable of dissolving in a solvent. Further a film formed of the polymer is generally required to have high transparency and little optical anisotropy for application in optical products. Furthermore, the polymer preferably has compatibility with the absorbers. As the polymer employed in the solvent casting method, preferred is cellulose triacetate. However, other polymers can be employed so long as they satisfy the above conditions.

In the case of employing cellulose triacetate as the polymer, a mixed solvent of dichloromethane and methanol is generally employed. Other solvents such as isopropyl alcohol and n-butyl alcohol can be employed so long as cellulose triacetate is not precipitated (e.g., during the procedure of preparing the dope or adding the particles to the dope). A ratio of cellulose triacetate and solvent in the dope is preferably 10:90 to 30:70 by weight (cellulose triacetate: solvent).

Polycarbonate resin usable in the invention is preferably aromatic carbonates in terms of their chemical and physical properties, and in particular, bisphenol A type polycarbonate is preferred. Among them, bisphenol A type derivatives, in which a benzene ring, cyclohexane ring or aliphatic hydrocarbon group is introduced in the phenol A moiety, are more preferable. In particular is preferred a polycarbonate obtained by making use of the derivative in which at least one of these groups is introduced asymmetrically with respect to the central carbon atom. For example, a polycarbonate obtained by making use of a carbonate such that two methyl groups attached to the central carbon atom of bisphenol A are replaced by a phenyl group or a hydrogen atom of each benzene ring of bisphenol A is replaced by a substituent such as methyl or phenyl group, asymmetrically with respect to the central carbon atom is preferably used. Concretely are those obtained, through a phosgene method or transesterification method, from 4,4'-dihydroxy-diphenylalkane or its halogen substituted derivative, such as 4,4'-dihydroxy-diphenylmethane, 4,4'-dihydroxy-diphenylethane or 4,4,'-dihydroxy-diphenylbutane.

The polycarbonate resin may be used in the form of a mixture with other transparent resins such as polystyrene type resin, poly methyl methacrylate type resin or cellulose acetate type resin. At least one side of a cellulose acetate type film may be laminated with the polycarbonate resin. A method of preparing the polycarbonate type resin film usable in the invention is not specifically limited. Films prepared by any of the extrusion method, solvent-casting method and calendering method may be used. Either a uniaxially stretched film or a biaxially stretched film may be used. The solvent-casting film is preferred in view of superiority in surface fineness and optical isotropy.

The polycarbonate resin film used in the invention has a glass transition point of 110° C. or higher (preferably, 120° C. or higher) and water absorption of 0.3% or less (preferably, 0.2% or less), wherein the water content was measured after being dipped in water at 23° C. for 24 hrs.

Another preferable material is PET for the transparent support material from a viewpoint of thermal resistance, solvent resistance, machinability, mechanical strength and the like in case of coating the non glare layer by means of various kinds of coating methods. In a particularly preferred embodiment, the antiglare, abrasion resistant coating of the invention is coated on at least one side of the transparent polymeric film described above. The antiglare film in such an embodiment may be advantageously employed as a protective film of a polarizing element, the polarizing element comprising a polarizing plate and the protective film provided on one side or both sides of the polarizing plate.

The invention extends to the use of the film of the invention in displays such as LCD displays and to touch screen displays. Polarizer elements can readily employ abrasion resistant antiglare films of the invention, and it is apparent that both abrasion resistance and antiglare are important in touch screen displays.

A further aspect of this invention comprises an antiglare film having the proper balance of transmission haze, gloss and high transparency so as to be useful in a variety of applications, including high definition applications, where a gloss value of less than 130 at 60° k, a transmission of at least 90%, and a transmission haze value of less than 50 are required.

EXAMPLES

The following examples illustrate the preparation of the optical film in accordance with this invention.

Materials

The UV radiation curable urethane acrylate oligomer CN 968 was obtained from Sartomer. The initiator, Irgacure184 was obtained from Ciba-Geigy. The cure lamp used was an H bulb from Fusion UV Systems, Inc. Spherical crosslinked polymethylmethacrylate particles (P1, average particle size 5 micrometers) were synthesized via suspension polymerization. The polyamide particles, Orgasol 2001 UD NAT 2 (P2, average particle size 5 micrometers), and Orgasol 3501 EX D NAT 1 (P3, average particle size 10 micrometers) were obtained from ATOFINA Chemicals, Inc. The UV curable lubricant Additive 31 was obtained from Dow Corning. Unless otherwise specified all coatings were coated on 4 mil TAC.

Pencil Hardness Measurements

The Pencil Hardness values of the coatings were measured as follows. All samples were conditioned at 73 F/50% RH for at least 18 hours prior to measurement. Following this conditioning period, the resistance to visible marking was determined using ASTM D 3363 ("Standard Test Method for Film Hardness by Pencil Test"). In this procedure, pencils of varying hardness were prepared by sanding the tips into cylindrical shapes. The lead tips were then brought in contact with the coating surface using a 500 gram load, held at a 45 degree angle relative to the plane of the coating, and moved at a uniform speed across the surface of the coatings. Visual inspection was then used to determine the hardest lead that did not generate any visible damage to the coating.

Indentation Modulus Measurements

The indentation modulus of the coatings was measured as follows. All samples were conditioned at 23° C. (73° F.)/50% RH for at least 18 hours prior to measurement. Following this conditioning period, the load-displacement properties of the materials were determined using a Hysitron nanoindenter equipped with a 2 micrometer radius, 60 degree conical diamond indenter. A 300 µN target load was used in all cases. The resulting load-displacement curves were then analyzed using the Oliver and Pharr relationship to calculate a reduced modulus for each coating.

Microscratch Measurements

The microscratch cracking onset of selected coatings was measured as follows. All samples were conditioned at 23° C. (73° F.)//50% RH for at least 18 hours prior to measurement. Following this conditioning period, ramped load scratches were generated in the 0.1-100 mN load range using a CSEM Nanoscratch Tester equipped with a 3.5 micrometer radius conical diamond stylus. The load required to initiate cracking in the coatings was then determined by visual inspection with the aid of an optical microscope.

Haze and Gloss Measurements

Haze was determined using a BYK Gardner Haze-Gard Plus instrument in accordance with ASTM D-1003 and JIS K-7105 methods. Gloss was determined (at 60 degrees) using a BYK Gardner micro Tri gloss meter in accordance with ASTM D523, ASTM D2457, ISO 2813 and JIS Z 8741 methods. The haze and gloss data in the above tables represent the average value taken from multiple readings made on each sample.

Examples 1-4

Abrasion Resistant Overcoats

The UV curable oligomer CN 968(12.6 g) was dissolved in n-propyl acetate(13.14 g) or methanol(13.14 g). To each of these solutions were added 0.36 g Irgacure 184 and 0.18 g Additive 31. These solutions were coated on TAC and cured at 0.75 j/cm$^2$ to obtain optically clear cured coatings of CN 968 at a nominal coverage of 7 g/m$^2$. The solution in n-propyl acetate was also coated on TAC to give another cured coating at a nominal coverage of 14 g/m$^2$. Table 1 shows various mechanical properties of these coatings as measured by pencil hardness, nanoindentation, and microscratch testing techniques.

TABLE 1

| Example | Overcoat | Overcoat Coverage (g/m²) | Coating Solvent | Pencil Hardness | Indentation Modulus (GPa) | Onset to Fracture (mN) |
|---|---|---|---|---|---|---|
| 1 (Check) | None | 0 | | <2B | 1.9 | N.A. |
| 2 | CN968 | 7 | Propyl acetate | 3H | 2.8 | 55.2 (brittle cracking) |
| 3 | CN968 | 7 | Methanol | 3H | 2.8 | 27.7 (brittle cracking) |
| 4 | CN968 | 14 | Propyl acetate | 4H | 3.0 | N.A. |

As Table 1 shows, solvents play a role in obtaining good abrasion resistance on supports such as TAC. The overcoat when coated out of methanol (Example 3) required a lower stylus load to initiate coating failure ("cracking") than the coating derived from propyl acetate (Example 2). While examples 2 and 3 both possessed similar pencil hardness ratings, the microscratch onset data suggests that the coating prepared from methanol still may be more susceptible to certain types of small asperity scratch damage than the corresponding coating prepared from propyl acetate. All of the coatings possessed higher pencil hardness ratings than bare TAC (Example 1). The overcoat when coated at 14 g/m² (Example 4) showed a higher pencil hardness than the overcoat at 7 g/m²

Examples 5-14

Antiglare Coating

The solution of CN968 in n-propyl acetate as described in Example 4, was modified to include particles for antiglare performance. Examples 5-9 contained spherical particles, P1. Examples 10-14 contained the asymmetric irregular particles, P2. All coatings had a nominal coverage of 14 g/m². Table 2 describes the composition of the coatings.

TABLE 2

| Examples | Particle Description(wt % wrt binder) | Avg. Haze | % Gloss |
|---|---|---|---|
| 5 | P1(5) | 8.83 | 134.84 |
| 6 | P1(10) | 15.88 | 123.52 |
| 7 | P1(20) | 28.20 | 105.84 |
| 8 | P1(30) | 35.86 | 95.74 |
| 9 | P1(40) | 50.48 | 91.94 |
| 10(Invention) | P2(4) | 1.73 | 123.4 |
| 11(Invention) | P2(8) | 3.84 | 97.24 |
| 12(Invention) | P2(10) | 4.36 | 94.32 |
| 13(Invention) | P2(20) | 8.25 | 66.72 |
| 14(Invention) | P2(30) | 15.02 | 50.52 |

As Table 2 shows the asymmetric irregular particles have an advantage over the spherical particles in lower haze values for comparable particle loading. This is due to easy removal of spherical particles from the surface leaving a pitted surface that causes the haze to increase.

Examples 15-19

Coatings as described in Examples 10-14 were prepared except the particles used were P3 at loadings of 2-10 wt % with respect to the polymer as shown in Table 3.

TABLE 3

| Example | Particle Loading % wrt polymer | Pencil Hardness | Avg. Haze | Avg. Gloss |
|---|---|---|---|---|
| 15 | 2 | 3H | 4.16 | 103.36 |
| 16 | 4 | 3H | 9.05 | 70.46 |
| 17 | 6 | 3H | 17.54 | 44.04 |
| 18 | 8 | 3H | 18.36 | 43.50 |
| 19 | 10 | 3H | 31.98 | 23.64 |

Table 3 shows yet another example of asymmetric irregular particles in a UV cured polymer that gives excellent pencil hardness, the desired gloss, and haze for an anti glare abrasion resistant coating.

Fingerprint resistance of the coatings were evaluated by observing the extent to which fingerprints left on samples for 24 hours were removed by wiping with a tissue. All the examples of this invention showed excellent fingerprint resistance.

The invention has been described in detail with particular reference to certain preferred embodiments thereof, but it will be understood that variations and modifications can be effected within the scope of the invention. The entire contents of the patents and other publications referred to in this specification are incorporated herein by reference.

What is claimed is:

1. A display comprising an optical film bonded to a polarizer, comprising a layer containing irregular semicrystalline asymmetric particles dispersed in a radiation cured binder, the average size of all of said irregular semicrystalline asymmetric particles being between 2 and 20 µm, wherein the film exhibits a 60 degree gloss that is less than 130, and a total light transmission that is greater than 90 percent.

2. The display of claim 1 wherein the radiation cured binder comprises polyfunctional acrylic compounds derived from polyhydric alcohols.

3. The display of claim 2 wherein the radiation cured binder comprises a repeating group selected from ethoxylated trimethylolpropane tri(meth)acrylate, tripropylene glycol di(meth)acrylate, trimethylolpropane tri(meth)acrylate, diethylene glycol di(meth)acrylate, pentaerythritol tetra (meth)acrylate, pentaerythritol tri(meth)acrylate, dipentaerythritol hexa(meth)acrylate, 1,6-hexanediol di(meth) acrylate, and neopentyl glycol di(meth)acrylate.

4. The display of claim 2 wherein the radiation cured binder comprises a repeating group selected from pentaerythritol tetra(meth)acrylate and pentaerythritol tri(meth) acrylate.

5. The display of claim 1 wherein the radiation cured binder comprises acrylate and methacrylate oligomers derived from low-molecular weight polyester resin, polyether resin, acrylic resin, epoxy resin, polyurethane resin.

6. The display of claim 1 wherein the radiation cured binder comprises a urethane acrylate compound.

7. The display of claim 1 wherein the radiation cured binder comprises an aliphatic urethane acrylate derived from isophorone diisocyanate.

8. The display of claim 1 wherein the radiation cured binder comprises a polyurethane acrylate derived from an aliphatic polyester polyol.

9. The display of claim 1 wherein the particles comprise micronized irregular polyamide or copolyamide polymer particles.

10. The display of claim 1 wherein said particles are present in at least 2% by weight of the layer.

11. The display of claim 1 wherein said particles are present in an amount of less than 50% by weight of the layer.

12. The display of claim 1 wherein the film additionally contains a silicone acrylate lubricant.

13. The display of claim 12 wherein the silicone acrylate lubricant is a methacryloxy-functional silicone polyether copolymer.

14. The display of claim 1 wherein said film has a pencil hardness of greater than 2H.

15. The display of claim 1 wherein said film has a hardness of between 2H and 8H.

16. The display of claim 1 wherein said film is deposed upon a transparent polymeric support.

17. The display of claim 16 wherein said support is selected from the group consisting of triacetyl cellulose, polyethylene terephthalate, diacetyl cellulose, acetate butyrate cellulose, acetate propionate cellulose, polyether sulfone, polyacrylic based resins, polyurethane based resin, polyester, polycarbonate, aromatic polyamide, polyolefins, polymers derived from vinyl chloride, polyvinyl alcohol, polysulfone, polyether, polynorbornene, polymethylpentene, polyether ketone, and (meth)acrylonitrile.

18. The display of claim 16 wherein said polymeric support is triacetyl cellulose.

19. The display of claim 1 is a touch screen display.

* * * * *